(12) United States Patent
Gilmutdinov et al.

(10) Patent No.: US 10,200,685 B2
(45) Date of Patent: Feb. 5, 2019

(54) METHOD FOR COMPRESSING DATA AND ORGANIC LIGHT EMITTING DIODE DISPLAY DEVICE USING THE SAME

(71) Applicants: LG DISPLAY CO., LTD., Seoul (KR); SAINT-PETERSBURG STATE UNIVERSITY OF AEROSPACE INSTRUMENTATION, St. Petersburg (RU)

(72) Inventors: Marat Gilmutdinov, Saint Petersburg (RU); Euiyeol Oh, Seoul (KR); Chulkwon Lee, Goyang-si (KR); Nickolay Egorov, Saint Petersburg (RU)

(73) Assignees: LG DISPLAY CO., LTD., Seoul (KR); SAINT-PETERSBURG STATE UNIVERSITY OF AEROSPACE INSTRUMENTATION, St. Petersburg (RU)

( * ) Notice: Subject to any disclaimer, the term of this patent is extended or adjusted under 35 U.S.C. 154(b) by 143 days.

(21) Appl. No.: 15/409,128

(22) Filed: Jan. 18, 2017

(65) Prior Publication Data

US 2017/0359574 A1 Dec. 14, 2017

(30) Foreign Application Priority Data

Jun. 9, 2016 (KR) ........................ 10-2016-0071694

(51) Int. Cl.
*H04N 11/02* (2006.01)
*H04N 19/10* (2014.01)
*H04N 19/50* (2014.01)
*H04N 19/124* (2014.01)
*H04N 19/182* (2014.01)
*G09G 3/3225* (2016.01)
*G09G 3/3233* (2016.01)

(52) U.S. Cl.
CPC .......... *H04N 19/10* (2014.11); *G09G 3/3225* (2013.01); *G09G 3/3233* (2013.01); *H04N 19/124* (2014.11); *H04N 19/182* (2014.11); *H04N 19/50* (2014.11); *G09G 2320/0285* (2013.01); *G09G 2320/043* (2013.01)

(58) Field of Classification Search
CPC ..................................................... H04N 19/10
USPC ..................................................... 375/240.03
See application file for complete search history.

(56) References Cited

U.S. PATENT DOCUMENTS 5,845,007 A * 12/1998 Ohashi ...................... G06T 7/12
382/199
5,905,807 A * 5/1999 Kado ................... A61B 5/1176
375/E7.083
6,167,150 A * 12/2000 Michael ............... G06K 9/4638
348/125

(Continued)

*Primary Examiner* — Leron Beck
(74) *Attorney, Agent, or Firm* — Dentons US LLP

(57) ABSTRACT

A method of compressing data comprising separating a bit stream of compensation data into a sub-bit stream including an impulse component and a sub-bit stream not including the impulse component, predicting and calculating a trend component of compensation data to be compressed using compressed compensation data, generating a noise component by eliminating the trend component from the compensation data, and separating and compressing an impulse component and a noise component of the compensation data from each other, wherein the impulse component is compressed without quantization and the noise component is quantized and compressed.

12 Claims, 11 Drawing Sheets

(56) References Cited

U.S. PATENT DOCUMENTS

| | | | |
|---|---|---|---|
| 2003/0067626 A1* | 4/2003 | Ohmori | H04N 1/33307 358/1.15 |
| 2004/0136586 A1* | 7/2004 | Okamura | G06K 9/38 382/137 |
| 2005/0276502 A1* | 12/2005 | Brown Elliott et al. | G06T 5/004 382/254 |
| 2006/0067388 A1* | 3/2006 | Sedarat | H04L 1/20 375/219 |
| 2006/0125807 A1* | 6/2006 | Park | G09G 3/3233 345/204 |
| 2009/0027310 A1* | 1/2009 | Kim | G09G 3/3233 345/76 |
| 2009/0309818 A1* | 12/2009 | Kim | G09G 3/3233 345/77 |
| 2010/0253608 A1* | 10/2010 | Kim | G09G 3/3233 345/76 |
| 2011/0090208 A1* | 4/2011 | Long | G09G 3/3233 345/211 |
| 2011/0188036 A1* | 8/2011 | Pan | G01J 3/42 356/320 |
| 2011/0205250 A1* | 8/2011 | Yoo | G09G 3/3233 345/690 |
| 2011/0210958 A1* | 9/2011 | Yoo | G09G 3/325 345/214 |
| 2011/0216056 A1* | 9/2011 | Yoo | G09G 3/32 345/212 |
| 2012/0155724 A1* | 6/2012 | Kitamura | G06T 7/60 382/128 |
| 2012/0201296 A1* | 8/2012 | Kim | H04N 19/61 375/240.03 |
| 2013/0141412 A1* | 6/2013 | Kang | G09G 3/3233 345/212 |
| 2015/0130780 A1* | 5/2015 | Kwon | G09G 3/3233 345/212 |
| 2015/0146977 A1 | 5/2015 | Ryu | |
| 2015/0348458 A1 | 12/2015 | Tian et al. | |
| 2016/0080055 A1* | 3/2016 | Sahin | C07D 307/12 375/267 |
| 2016/0267844 A1* | 9/2016 | Senda | G09G 3/3233 |

* cited by examiner

METHOD FOR COMPRESSING DATA AND ORGANIC LIGHT EMITTING DIODE DISPLAY DEVICE USING THE SAME

CROSS-REFERENCE TO RELATED APPLICATIONS

This application claims the priority of Korean Patent Application No. 10-2016-0071694 filed on Jun. 9, 2016, in the Korean Intellectual Property Office, the disclosure of which is hereby incorporated by reference in its entirety.

BACKGROUND

1. Technical Field

The present disclosure relates to a method for compressing data and an organic light emitting diode display device using the same.

2. Description of the Related Art

As information-oriented society develops, demands for a display device displaying an image are increased in various forms. Recently, various flat display devices such as a liquid crystal display device, a plasma display device, an organic light emitting diode device, an organic light emitting diode device, and the like are used.

Among these devices, the organic light emitting diode display device employs a self light emitting element and thus has advantages in which a response time is fast, light emitting efficiency is high, and luminance and viewing angle are large.

Such an organic light emitting diode display device generally employs a current driving method that controls an amount of current and luminance of an organic light emitting diode.

FIG. 1 is an equivalent circuit diagram of a pixel of a typical organic light emitting diode display device.

As shown in FIG. 1, a pixel P includes a switching transistor $T_{sw}$, a driving transistor $T_{dr}$, an organic light emitting diode EL, and a capacitor $C_{st}$.

In particular, the switching transistor $T_{sw}$ applies a data voltage to a first node N1 in response to a scan signal. Further, the driving transistor $T_{dr}$ receives a driving voltage VDD applied thereto, and applies a current to the organic light emitting diode EL according to the driving voltage VDD and a voltage applied to the first node N1. And then, the capacitor $C_{st}$ sustains the voltage applied to the first node N1 for one frame.

A method for driving an organic light emitting diode display device including such a pixel P will be described.

Firstly, when a scan signal is applied to a gate line GL, the switching transistor $T_{sw}$ is turned on. At this point, a voltage applied to a data line DL is charged at the capacitor $C_{st}$ via the switching transistor $T_{sw}$.

Next, when the scan signal is not applied to the gate line GL any longer, the driving transistor $T_{dr}$ is driven by the data voltage charged at the capacitor $C_{st}$. At this point, a current corresponding to the data voltage flows at the organic light emitting diode EL such that an image is displayed.

Here, the current flowing at the organic light emitting diode EL is significantly affected by a threshold voltage of the driving transistor $T_{dr}$. A value of such a threshold voltage of the driving transistor $T_{dr}$ is varied due to continuous applying of gate bias stress for a long time. This causes a characteristic deviation between the pixels P and thus image quality is degraded.

To address a problem in degradation of the image quality, a current flowing through the driving transistor $T_{dr}$ of each of the pixels P is sunk, a characteristic of the driving transistor $T_{dr}$ is sensed, and then compensation data is calculated by using the sensed characteristic for external compensation algorithm. Further, the calculated compensation data is reflected to data being input from the external and is supplied to each of the pixels P.

Meanwhile, before the calculated compensation data is reflected to the data being input from the external, it is stored in a memory and then is supplied together with the data.

At this point, since the compensation data generally has a size of 10 bits per one pixel P, an organic light emitting diode display device having ultra high definition (UHD) resolution has a size of 3840×2160×3×10 bits based on an organic light emitting diode display device having ultra high definition (UHD) resolution.

Therefore, the organic light emitting diode display device should employ a large capacity memory that is able to store compensation data having such a size. However, such a large capacity memory can increase a manufacturing cost of the organic light emitting diode display device. Generally, to reduce an increase of the manufacturing cost caused by employing a large capacity memory, compensation data is compressed before being stored in a memory, and it is then restored and supplied to each of the pixels P.

FIG. 2 is a block diagram of a conventional data compression device.

As shown in FIG. 2, the conventional data compression device is configured with a discrete cosine transform (DCT) unit 10, a quantization unit 11, and an entropy coder 12.

Here, the DCT unit 10 divides and processes input data into one block unit consisting of predetermined pixels, for example, 8×8 pixels. The DCT unit 10 transforms data having high correlation between adjacent pixels with respect to each block unit into a frequency domain.

The quantization unit 11 divides a frequency value obtained from the DCT unit 10 by a quantization step value that is varied according to each of the frequency values, and performs a process of reducing the number of significant bits (that is, a quantization process). Meanwhile, when data' undergone such a quantization process is restored, a difference in data loss occurs according to a characteristic of data. That is, a loss of data having a high frequency value is greater than that of data having a low frequency value.

The entropy coder 12 performs a compression process on the frequency values undergone the quantization process in consideration of occurrence probability of data loss.

However, such a compression method is a method applied to general image data, and thus the following problems may occur when the compression method is applied to compensation data.

In other words, although a large amount of loss occurs at image data having a high frequency value when the image data is compressed, perceptual image quality is generally not affected. On the other hand, since compensation data is data for compensating a deviation of a threshold voltage of a driving transistor, perceptual image quality is affected when a large amount of loss occurs while compensation data having a high frequency value is compressed.

Therefore, compensation data is generally compressed through a semi-lossless compression method or a lossless compression method.

Here, the semi-lossless compression method is a method in which a quantization step value being set to minimize a loss of compensation data is applied to all pixels to perform quantization. Also, the lossless compression method is a method for performing compression without performing quantization.

However, such compression methods require a capacity increase of a memory so as to store compressed compensation data such that there is a problem in that cost for employing a large capacity memory is increased.

SUMMARY

It is an object of the present disclosure to provide a method for compressing compensation data and an organic light emitting diode display device using the same which are capable of reducing a loss of a trend component and an impulse component of compensation data which are relatively important than other components of compensation data, and, at the same time, improving a compression ratio of compensation data.

It is another object of the present disclosure to provide a method for compressing data and an organic light emitting diode display device using the same which are capable of reducing a needed capacity of a memory for storing compensation data to reduce cost for employing a large capacity memory.

As described above, compensation data is conventionally compressed using a semi-lossless compression method or a lossless compression method.

However, since such compression methods require a capacity increase of a memory for storing compressed compensation data, there is a problem in that cost for employing a large capacity memory is increased.

To address the above described problem, the present disclosure separates a bit stream of compensation data into a sub-bit stream including an impulse component and a sub-bit stream not including the impulse component. Further, a trend component of compensation data to be compressed is predicted and calculated using compressed compensation data, and a noise component is generated by eliminating the trend component from the compensation data. Further, an impulse component and a noise component of the compensation data are separated and compressed from each other, wherein the impulse component is compressed without quantization and the noise component is quantized and compressed.

A method for compressing data including a trend component and a noise component having an error value based on the trend component according to the present disclosure includes receiving $n^{th}$ data, wherein n is a natural number equal to or greater than 2; restoring $(n-1)^{th}$ data by receiving a trend component of the $(n-1)^{th}$ data and a noise component thereof; predicting and calculating a trend component of the $n^{th}$ data using the restored $(n-1)^{th}$ data; extracting a noise component of the $n^{th}$ data by eliminating the calculated trend component of the $n^{th}$ data therefrom; and quantizing and compressing the extracted noise component of the $n^{th}$ data.

Further, an organic light emitting diode display device using the method for compressing data of the present disclosure includes a data driving unit configured to generate compensation data including a trend component and a noise component that has an error value based on the trend component; a data restoration unit configured to restore $(n-1)^{th}$ compensation data by receiving a trend component and a noise component of the $(n-1)^{th}$ compensation data, wherein n is a natural number equal to or greater than 2; a trend calculation unit configured to receive $n^{th}$ compensation data and predict and calculate a trend component of the $n^{th}$ compensation data using the restored $(n-1)^{th}$ compensation data; a noise extraction unit configured to extract a noise component of the $n^{th}$ compensation data by eliminating the calculated trend component of the $n^{th}$ compensation data therefrom; and a noise encoder configured to quantize and compress the extracted noise component of the $n^{th}$ compensation data.

Through such a method, losses of the trend component and the impulse component having more importance than other components may be reduced and at the same time a compression ratio may be improved. In addition, as the compression ratio is improved, a capacity of the memory for storing the compensation data may be reduced so that a manufacturing cost of a display device due to a capacity reduction of the memory may also be reduced.

In accordance with the present disclosure, the trend component is not quantized and compressed, the impulse component is compressed without quantization, and the noise component is quantized and compressed by relatively and largely setting a quantization step value such that losses of the trend component and the impulse component having importance than other components may be reduced and at the same time a compression ratio of compensation data may be improved.

Also, as the compression ratio is improved, a capacity of the memory for storing the compensation data may be reduced so that a manufacturing cost of a display device due to a capacity reduction of the memory may also be reduced.

DETAILED DESCRIPTION

Figure 1:
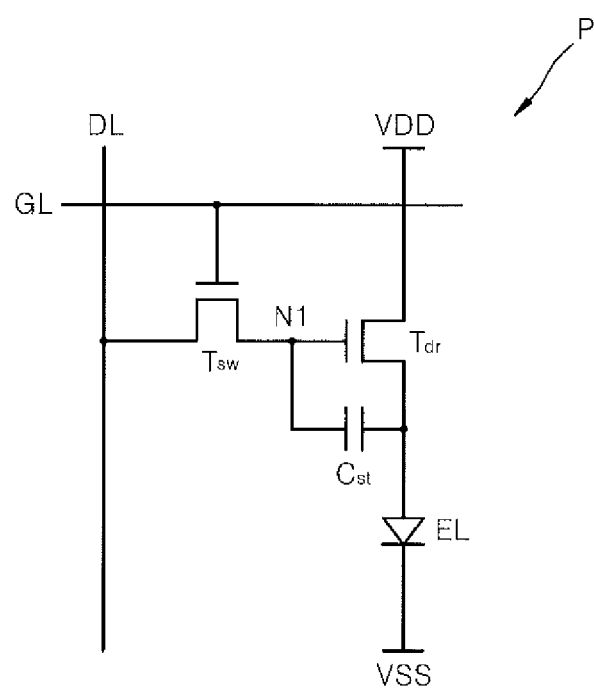
FIG. 1 is an equivalent circuit diagram of a pixel of a conventional organic light emitting diode display device.
Figure 2:
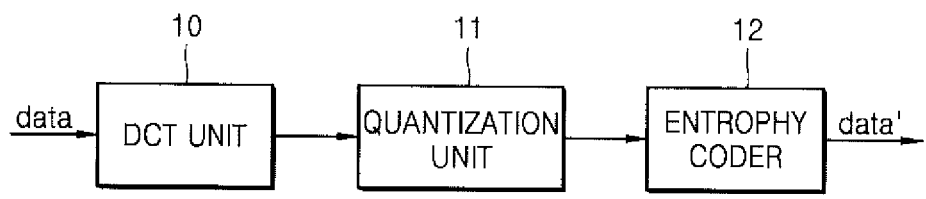
FIG. 2 is a block diagram of a conventional data compression device.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Figure 3:
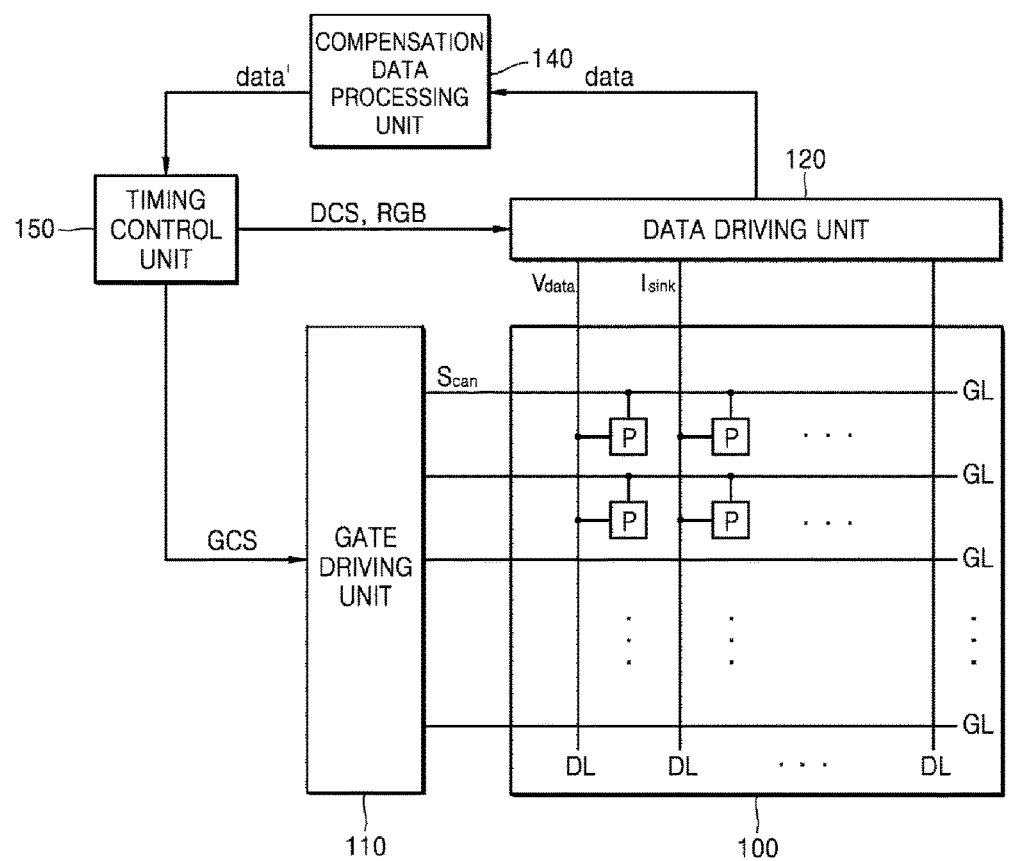
FIG. 3 is a diagram illustrating an organic light emitting diode display device according to an embodiment of the present disclosure.

FIG. 3 is a diagram illustrating an organic light emitting diode display device according to an embodiment of the present disclosure.

As shown in FIG. 3, the organic light emitting diode display device according to the embodiment of the present disclosure includes a display panel 100, a gate driving unit 110, a data driving unit 120, a compensation data processing unit 140, and a timing control unit 150.

In particular, the display panel 100 includes a plurality of gate lines GL and a plurality of data lines DL which intersect with each other, and a plurality of pixels P, each of which is disposed at every intersection of the respective gate lines GL and the respective data lines DL. Further, referring to FIG. 1, each of the plurality of pixels P includes a switching transistor $T_{sw}$, a driving transistor $T_{dr}$, an organic light emitting diode EL, and a capacitor $C_{st}$.

The gate driving unit 110 sequentially supplies a scan signal $S_{can}$ to each of the gate lines GL.

The data driving unit 120 supplies a data voltage $V_{data}$ to the data lines DL, and senses a sink current flowing at each of the data lines DL to generate compensation data data corresponding to the sink current. Further, a data compensation circuit (not shown) to which an external compensation algorithm is applied may be embedded in the data driving unit 120 to generate the compensation data data.

The compensation data processing unit 140 quantizes, compresses, and stores the compensation data data generated by the data driving unit 120, and inverse quantizes and restored the stored compensation data data to supply the inverse quantized and restored compensation data data to the timing control unit 150. Further, the compensation data processing unit 140 may be embedded in the organic light emitting diode display device, separated from the timing control unit 150.

The timing control unit 150 reflects the restored compensation data data' to an image data RGB being input from an external source, and aligns the image data RGB to a size, resolution thereof, and the like, of the display panel 100, to supply the aligned image data RGB to the data driving unit 120.

Also, the timing control unit 150 generates a plurality of gate control signals GCS and a plurality of data control signals DCS using synchronous signals being input from an external source, and supplies the gate control signals GCS and the data control signals DCS to the gate driving unit 110 and the data driving unit 120, respectively.

Figure 4:
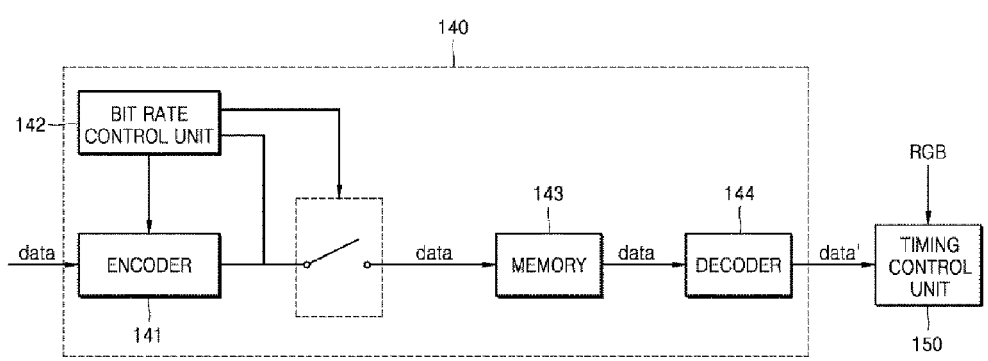
FIG. 4 is a detailed diagram illustrating a compensation data processing unit of FIG. 3.

FIG. 4 is a detailed diagram illustrating the compensation data processing unit 140 of FIG. 3.

As shown in FIG. 4, the compensation data processing unit 140 according to the embodiment of the present disclosure includes an encoder 141, a bit rate control unit 142, a memory 143, and a decoder 144.

Here, the encoder 141 compresses the compensation data data generated by the data driving unit 120 of FIG. 3.

Further, the bit rate control unit 142 assigns a bit number of to-be-compressed compensation data data according to a probability of a binary value of the to-be-compressed compensation data data being generated in other compensation data data which is already compressed.

That is, the bit rate control unit 142 assigns a smaller bit number as an occurrence frequency of a binary value in another compressed compensation data having the same value as the binary value of the to-be-compressed compensation data data is greater. Through such a process, the encoder 141 may compress the compensation data data with an optimum bit number.

At this point, when the compensation data data has a plurality of binary values, the bit rate control unit 142 repetitively performs the above described bit number assignment process on each of the binary values to assign final bit numbers.

As described above, the compensation data data compressed by the encoder 141 is stored in the memory 143. Thereafter, the compensation data data stored in the memory 143 is inverse quantized and restored by the decoder 144 and is supplied to the timing control unit 150. Further, the timing control unit 150 reflects the restored compensation data data' to the image data RGB supplied from the external source to supply the image data RGB to the data driving unit 120 of FIG. 3.

Generally, to analyze a size of compensation data data of a pixel, since compensation data data assigned to adjacent pixels P have values similar to each other, the compensation data data of the pixel may be predicted through compensation data data of pixel(s) closest in distance to the pixel. Hereinafter, a configuration component of compensation data data will be described on the basis of the above description.

In the present disclosure, the compensation data data consists of a trend component, a noise component and an impulse component. Here, the trend component refers to a component having similar values between compensation data data assigned to adjacent pixels P, the noise component refers to a component having an error value on the basis of the trend component, and the impulse component refers to a component having an error value greater than the error value of the noise component.

In particular, the trend component is an actual value that is used in compensating for a deviation of a threshold voltage of the driving transistor $T_{dr}$, and it is a value that should be maintained in compression and restoration processes without a loss.

Further, since trend components of compensation data data, which are assigned to adjacent pixels P, are similar to each other, a trend component of compensation data data assigned to a to-be-compressed pixel is already compressed, and may be predicted from compensation data data of a pixel P closest in distance to the to-be-compressed pixel in a pixel arrangement.

In addition, the noise component is a value that is not used in compensating for a deviation of a threshold voltage of the driving transistor Tdr, and thus compensation can occur even when the noise component is lost in the compression and restoration processes. The noise component may be calculated through a difference between a primitive value of compensation data data and a predicted value thereof. This will be described in detail below.

Additionally, the impulse component has a value that is significantly different from the trend component, which needs to be maintained in compression and restoration processes without a loss. That is, since the impulse component includes a command for blocking power of an organic light emitting diode, and the like when damage to a driving transistor and the like occur, it needs to be maintained without a loss.

Further, the impulse component is generated due to damage to the driving transistor $T_{dr}$, and the like, and therefore it is not necessary for it to be included in all compensation data data.

The compensation data processing unit 140 according to the embodiment of the present disclosure separates and compresses the noise component and the impulse component from compensation data data which includes the above described trend component, noise component, and impulse component.

Figure 5:
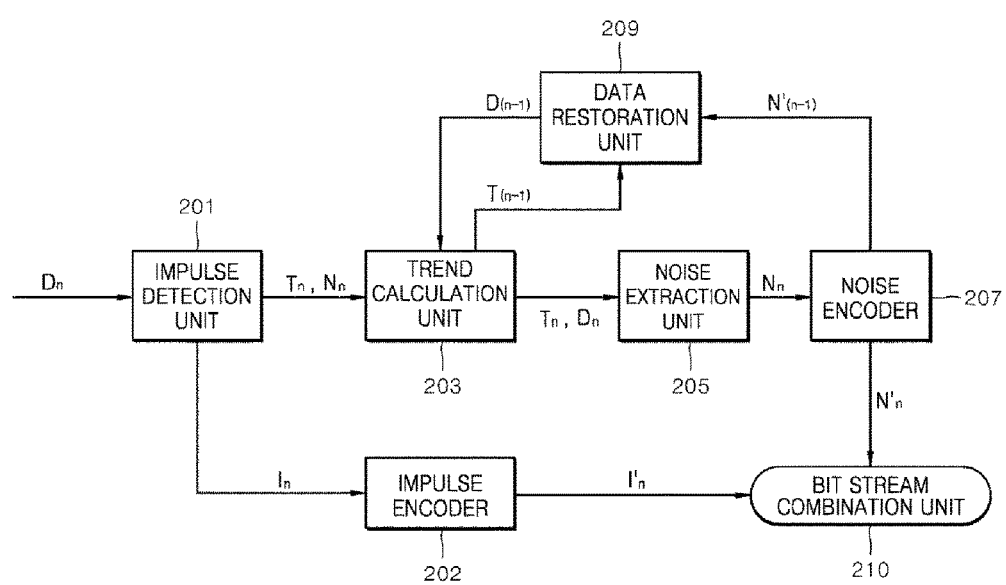
FIG. 5 is a detailed diagram illustrating an encoder of FIG. 4.
Figure 6:
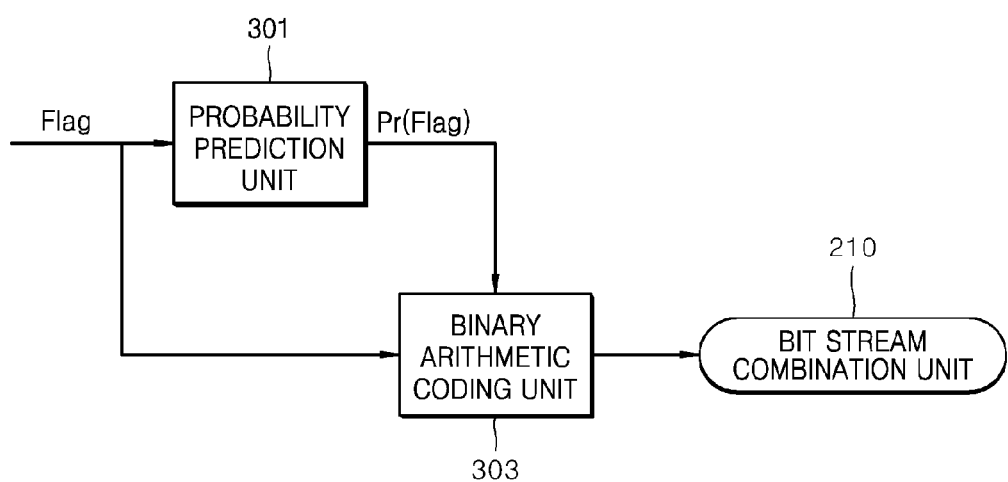
FIGS. 6 and 7 are diagrams illustrating an impulse encoder for controlling a bit rate of an impulse component.
Figure 7:
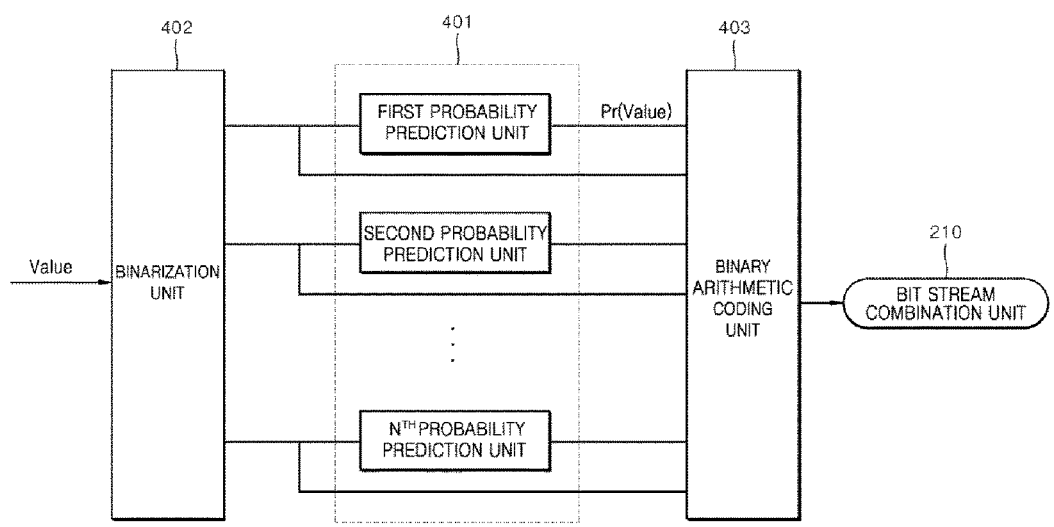

FIG. 5 is a detailed diagram illustrating the encoder 141 of FIG. 4, and FIGS. 6 and 7 are diagrams illustrating the impulse encoder 202 for controlling a bit rate of an impulse component.

As shown in FIG. 5, the encoder 141 of FIG. 4 includes an impulse detection unit 201, a trend calculation unit 203, a noise extraction unit 205, a noise encoder 207, a data restoration unit 209, and an impulse encoder 202.

The impulse detection unit 201 receives $n^{th}$ compensation data $D_n$ (here, n is a natural number equal to or greater than 2) generated from the data driving unit 120 of FIG. 3, and separates a sub-bit stream including an impulse component $I_n$ and a sub-bit stream not including the impulse component $I_n$ from the $n^{th}$ compensation data $D_n$.

Here, the impulse component $I_n$ of the $n^{th}$ compensation data $D_n$, which is currently to be compressed, may be detected through a probability prediction with respect to previous compensation data including $(n-1)^{th}$ compensation data $D_{(n-1)}$, that has been compressed. At this point, the previous compensation data including the $(n-1)^{th}$ compensation data $D_{(n-1)}$, are compensation data assigned to pixels which are located at the periphery of a pixel corresponding to the $n^{th}$ compensation data $D_n$.

In particular, when there are many compensation data including an impulse component among previous compensation data including the $(n-1)^{th}$ compensation data $D_{(n-1)}$, that has been compressed, the probability that the $n^{th}$ compensation data $D_n$ includes the impulse component $I_n$ is increased. If such probability is equal to or greater than a predetermined reference, it may be determined that the $n^{th}$ compensation data $D_n$ includes the impulse component $I_n$. At this point, impulse components of the previous compensation data including the $(n-1)^{th}$ compensation data $D_{(n-1)}$, may be supplied from the impulse encoder 202.

Each of the sub-bit streams, which are separated by the impulse detection unit 201, includes a flag Flag for discriminating whether the impulse component $I_n$ is included in the $n^{th}$ compensation data $D_n$, and a value of the impulse component $I_n$ when the impulse component $I_n$ is included in the $n^{th}$ compensation data $D_n$.

In particular, when the impulse component $I_n$ is included in the sub-bitstream of the $n^{th}$ compensation data $D_n$, the impulse detection unit 201 assigns a binary value of 1 to a flag Flag of the sub-bit stream. On the other hand, when the impulse component $I_n$ is not included in the sub-bitstream of the $n^{th}$ compensation data $D_n$, the impulse detection unit 201 assigns a binary value of 0 to the flag Flag of the sub-bit stream. The sub-bit streams separated through such a process thus undergo different compensation processes.

Firstly, a compression process, which is performed on a sub-bit stream including the impulse component $I_n$ through the impulse encoder 202, will be described.

As described above, the sub-bit stream including the impulse component $I_n$ does not undergo a quantization process because the impulse component $I_n$ should be maintained without a loss in the compression and restoration processes.

As shown in FIGS. 6 and 7, the impulse encoder 202 includes a binarization unit 402, a probability prediction unit 301 or 401, and a binary arithmetic coding unit 303 or 403 and compresses the sub-bit stream including the impulse component $I_n$ with an optimum bit number.

FIG. 6 illustrates how the impulse encoder 202 processes a flag of the sub-bit stream including the impulse component, and FIG. 7 illustrates how the impulse encoder 202 processes a value of the impulse component.

In particular, the probability prediction unit 301 may predict an optimum bit number using a flag Flag of the sub-bit stream including the impulse component $I_n$. At this point, the probability prediction unit 301 selects peripheral pixels as samples for predicting a probability that a binary value of the flag Flag of the sub-bit stream including the impulse component $I_n$ is input. Further, the probability prediction unit 301 predicts and assigns a bit number Pr(Flag) with respect to the flag Flag of the sub-bit stream including the impulse component $I_n$, which is currently to be compressed, according to an occurrence probability of a binary value having the same value as the binary value of the flag Flag of the sub-bit stream including the impulse component $I_n$ among binary values of flags of the sub-bit stream including impulse components of the selected peripheral pixels.

That is, when there are many binary values having the same value as the binary value of the flag Flag of the sub-bit stream including the impulse component $I_n$, which is currently to be compressed, among the binary values of the flags of the sub-bit stream including the impulse components of the selected peripheral pixels, the probability prediction unit 301 assigns a smaller bit number for coding the flag Flag of the sub-bit stream including the impulse component $I_n$. On the other hand, when there are less binary values having the same value as the binary value of the flag Flag of the sub-bit stream including the impulse component $I_n$, which is currently to be compressed, among the binary values of the flags of the sub-bit stream including the impulse components of the selected peripheral pixels, the probability prediction unit 301 assigns a greater bit number for coding the flag Flag of the sub-bit stream including the impulse component $I_n$. Further, the binary arithmetic coding unit 303 compresses the flag Flag of the sub-bit stream including the impulse component $I_n$ with the bit number assigned by the probability prediction unit 301. Also, the compressed flag Flag of the sub-bit stream including the impulse component $I_n$ is supplied to a bit stream combination unit 210.

Meanwhile, as described above, since the flag Flag of the sub-bit stream including the impulse component $I_n$ is a binary value, there is no need to perform a binarization process through the binarization unit 402. On the other hand, since the size Value of the impulse component $I_n$ is not a binary value, it should be transformed into a binary value through the binarization unit 402 unlike the flag Flag of the impulse component $I_n$.

Such a binary value transformation is performed through a binarization function, and a binarization function Unary(x) is defined by the following Equation 1.

$$\text{Unary}(x)=\{01,02,\ldots,0x,1\} \quad \text{[Equation 11]}$$

Here, x refers to the number of 0, and 1 is a number for discriminating binary values of a size Value of the impulse component $I_n$.

For example, when the size Value of the impulse component $I_n$ is 22, it may be expressed as a binary value of {0, 0, 1, 0, 0, 1} using the binarization function Unary(x).

A bit number of the binarized size Value of the impulse component $I_n$ is predicted by the probability prediction unit 401 at every binary value. That is, when a binary number is consist of n number of binary values, n number of probability prediction units 401 predict a bit number with respect to each binary value. For example, when a size Value of the impulse component $I_n$ is a binary number of {0, 0, 1, 0, 0, 1}, a bit number of each binary value is predicted through six probability prediction units 401.

In particular, an optimum bit number of the size Value of the impulse component $I_n$ may be predicted by the probability prediction unit 401. At this point, the probability prediction unit 301 receives binary values of the size Value of the impulse component $I_n$ and selects peripheral pixels as a sample for predicting probability. Further, the probability prediction unit 301 predicts and assigns a bit number Pr(Value) with respect to the size Value of the impulse component $I_n$, which is currently to be compressed, according to occurrence probability of binary values having the same value as the binary values of the size Value of the impulse component $I_n$ among binary values of sizes of impulse components of the selected peripheral pixels.

That is, when there are many binary values having the same value as the binary value of the size Value of the impulse component $I_n$, which is currently to be compressed, among the binary values of the sizes of the impulse components of the selected peripheral pixels, the probability prediction unit 301 assigns a less bit number for coding the size Value of the impulse component $I_n$. On the other hand, when there are less binary values having the same value as the binary value of the size Value of the impulse component $I_n$, which is currently to be compressed, among the binary values of the sizes of the impulse components of the selected peripheral pixels, the probability prediction unit 301 assigns a greater bit number for coding the size Value of the impulse component $I_n$.

Further, the binary arithmetic coding unit 403 compresses the size Value of the impulse component $I_n$ with the bit number assigned by the probability prediction unit 401. Also, the compressed size Value of the impulse component $I_n$ is supplied to the bit stream combination unit 210.

Next, a compression process of the sub-bit stream not including the impulse component $I_n$ will be described.

As shown in FIG. 5, the encoder 141 of FIG. 4 includes the trend calculation unit 203, the noise extraction unit 205, the noise encoder 207, and a data restoration unit 209 to compress the sub-bit stream not including the impulse component $I_n$.

Here, the trend calculation unit 203 predicts and calculates a trend component $T_n$ of the $n^{th}$ compensation data $D_n$ using the $(n-1)^{th}$ compensation data $D_{(n-1)}$.

Meanwhile, since the $(n-1)^{th}$ compensation data $D_{(n-1)}$ is in a compressed state, it should be restored. To restore the $(n-1)^{th}$ compensation data $D_{(n-1)}$, a trend component $T_{(n-1)}$ and a noise component $N_{(n-1)}$ of the $(n-1)^{th}$ compensation data $D_{(n-1)}$ is required.

At this point, the trend component $T_{(n-1)}$ of the $(n-1)^{th}$ compensation data $D_{(n-1)}$ has already been predicted and calculated from the previous compensation data to be stored in the trend calculation unit 203. Further, since the trend component $T_{(n-1)}$ has already been removed from the $(n-1)^{th}$ compensation data $D_{(n-1)}$, a noise component $N_{(n-1)}$ of the $(n-1)^{th}$ compensation data $D_{(n-1)}$ has already been extracted, quantized and compressed to be stored in the noise encoder 207.

Also, since a noise component $N'_{(n-1)}$ of the $(n-1)^{th}$ compensation data $D_{(n-1)}$ has already been quantized and compressed, the quantized and compressed noise component $N'_{(n-1)}$ should be inverse quantized and decompressed to $N_{(n-1)}$ so as to restore the $(n-1)^{th}$ compensation data $D_{(n-1)}$.

For this purpose, the data restoration unit 209 receives the quantized and compressed noise component $N'_{(n-1)}$ of the $(n-1)^{th}$ compensation data $D_{(n-1)}$ from the noise encoder 207, and then inverse quantizes and decompresses the quantized and compressed noise component $N'_{(n-1)}$. Further, the data restoration unit 209 receives the trend component $T_{(n-1)}$ of the $(n-1)^{th}$ compensation data $D_{(n-1)}$ from the trend calculation unit 203 and then restores the $(n-1)^{th}$ compensation data $D_{(n-1)}$ by combining the trend component $T_{(n-1)}$ with the inverse quantized and decompressed noise component $N_{(n-1)}$.

The trend calculation unit 203 receives the sub-bit stream of the $n^{th}$ compensation data $D_n$, which does not including the impulse component $I_n$ from the impulse detection unit 201, and the $(n-1)^{th}$ compensation data $D_{(n-1)}$ from the data restoration unit 209, and predicts and calculates the trend component $T_n$ of the $n^{th}$ compensation data $D_n$.

At this point, the trend component $T_n$ of the $n^{th}$ compensation data $D_n$ is defined by the following Equations 2 and 3.

$$Nn = Dn - D(n-1) \qquad \text{[Equation 2]}$$

$$Dn - Nn = Tn \qquad \text{[Equation 3]}$$

Here, the noise component $N_n$ of the $n^{th}$ compensation data $D_n$ is defined by Equation 2 as a value obtained by subtracting the $(n-1)^{th}$ compensation data $D_{(n-1)}$ from the $n^{th}$ compensation data $D_n$, and the trend component $T_n$ of the $n^{th}$ compensation data $D_n$ is defined by Equation 3 as a value obtained by subtracting the noise component $N_n$ of the $n^{th}$ compensation data $D_n$ from the $n^{th}$ compensation data D.

As a result, combining Equations 2 and 3 with each other, the trend component $T_n$ of the $n^{th}$ compensation data $D_n$ can be obtained and defined as a function of the $(n-1)^{th}$ compensation data $D_{(n-1)}$.

Meanwhile, since there is no previous compensation data of a first compensation data, a trend component of such a first compensation data is not calculated by the trend calculation unit 203. However, to calculate a trend component of second compensation data, a trend component and a noise component of the first compensation data which are predetermined values, and which are respectively stored in the trend calculation unit 203 and the noise encoder 207, can be used.

As another embodiment of the present disclosure, the trend component $T_n$ of the $n^{th}$ compensation data $D_n$ may be calculated through a probability prediction based on previous compensation data, including the $(n-1)^{th}$ compensation data $D_{(n-1)}$. Hereinafter, a method in which the trend calculation unit 203 calculates the trend component $T_n$ of the $n^{th}$ compensation data $D_n$ using previous compensation data including the $(n-1)^{th}$ compensation data $D_{(n-1)}$, will be described.

Figure 8:
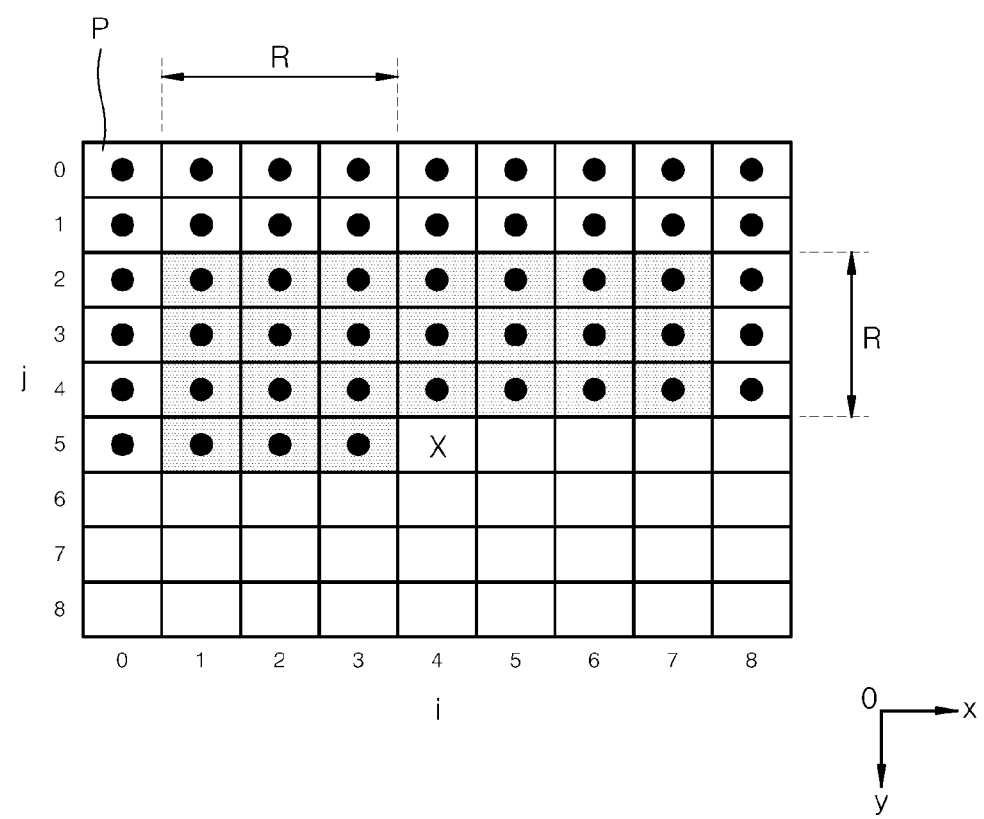
FIG. 8 is a diagram illustrating a 2-dimensional pixel arrangement for describing a method for calculating a trend component in a trend calculation unit of FIG. 5 according to another embodiment of the present disclosure.

FIG. 8 is a diagram illustrating a 2-dimensional pixel arrangement for describing a method for calculating a trend component in a trend calculation unit of FIG. 5 according to the another embodiment of the present disclosure.

A method for calculating the trend component $T_n$ of the $n^{th}$ compensation data $D_n$ employ a probability prediction method based on previous compensation data, including the $(n-1)^{th}$ compensation data $D_{(n-1)}$, and include a sliding average method, a Gaussian method, a distance function method, and the like.

Here, the sliding average method is a method in which an average value of previous compensation data including $(n-1)^{th}$ compensation data $D_{(n-1)}$, which is assigned to predetermined pixels peripheral to a pixel P to which $n^{th}$ compensation data $D_n$ is assigned, is calculated as a trend component Tn of $n^{th}$ compensation data D.

The Gaussian method is a method in which previous compensation data assigned to a large number of pixels P peripheral to a pixel P to which the compensation data $D_n$ is assigned, which includes $(n-1)^{th}$ compensation data $D_{(n-1)}$, is used to calculate a trend component $T_n$ of $n^{th}$ compensation data $D_n$.

The distance function method is a method for counting the number of pixels P peripheral to a pixel P to which the compensation data $D_n$ is assigned, to which previous compensation data including $(n-1)^{th}$ compensation data $D_{(n-1)}$, are assigned.

In particular, as shown in FIG. 8, the distance function method is a method for calculating trend component $T_n$ of $n^{th}$ compensation data $D_n$ by applying the above described sliding average method or Gaussian method to pixels P to which previous compensation data is assigned, wherein the previous compensation data includes $(n-1)^{th}$ compensation data $D_{(n-1)}$ being firstly input among the pixels P within a distance R in an x-axis direction and a y-axis direction from a pixel P (marked X in FIG. 8) to which the $n^{th}$ compensation data $D_n$ is assigned.

Meanwhile, when compensation data including an impulse component exists among previous compensation data including $(n-1)^{th}$ compensation data $D_{(n-1)}$ that is assigned to pixels P within the distance R, a pixel P existing in a closest distance except the compensation data including an impulse component and to which compensation data not including an impulse component is assigned is included in the counting.

The noise extraction unit 205 extracts a noise component $N_n$ of the $n^{th}$ compensation data $D_n$ by eliminating a trend component Tn of the $n^{th}$ compensation data $D_n$ calculated by the trend calculation unit 203 from the $n^{th}$ compensation data $D_n$ not including an impulse component $I_n$.

A noise component Nn(i, j) or N'n of the $n^{th}$ compensation data $D_n$ extracted by the noise extraction unit 205 is defined by the following Equation 4.

$$Nn(i,j)=Dn(i,j)-Tn(i,j) \qquad \text{[Equation 4]}$$

Here, Dn(i,j) is the $n^{th}$ compensation data $D_n$ not including an impulse component, and Tn(i,j) is a trend component $T_n$ of the $n^{th}$ compensation data $D_n$ calculated from the $(n-1)^{th}$ compensation data $D_{(n-1)}$. Further, i is an x-axis position of a 2-dimensional pixel P and is a natural number equal to or greater than 0, and j is a y-axis position of a 2-dimensional pixel P and is a natural number equal to or greater than 0.

According to Equation 4, the noise component Nn(i, j) of $n^{th}$ compensation data Dn(i, j) is defined as a value obtained by subtracting the trend component Tn(i, j) of $n^{th}$ compensation data Dn from the $n^{th}$ compensation data Dn(i, j).

The noise encoder 207 quantizes and compresses the noise component Nn of $n^{th}$ compensation data Dn extracted by the noise extraction unit 205. In particular, the noise encoder 207 quantizes the noise component Nn of $n^{th}$ compensation data Dn and determines a sign sign and a magnitude Mg of the quantized noise component N'n. At this point, the noise encoder 207 may quantize the noise component Nn by setting a uniform quantization step value to all pixels P, or a different quantization step value to each of the pixels P.

Meanwhile, since the noise component Nn is not used for compensating a deviation of a threshold voltage of the driving transistor $T_{dr}$, the compensation can proceed whether a loss in the noise component Nn occurs in the compression and restoration processes.

As a result, in accordance with the present disclosure, the trend component Tn of the $n^{th}$ compensation data Dn is not quantized and compressed, the impulse component In thereof is compressed without quantization, and the noise component Nn is quantized and compressed by relatively and largely setting a quantization step value, such that losses of the trend component Tn and the impulse component may be reduced, and at the same time a compression ratio of the $n^{th}$ compensation data Dn may be improved.

As such, as the compression ratio is improved, a capacity of the memory 143 of FIG. 4 for storing the compensation data may be reduced so that cost for employing a large capacity memory 143 of FIG. 4 may also be reduced.

Hereinafter, a process of quantizing and compressing the noise component Nn of the $n^{th}$ compensation data Dn will be described in detail.

The noise component Nq(i, j) or N'n quantized by the noise encoder 207 is defined by the following Equation 5.

$$Nq(i,j)=Q(Nn(i,j)) \qquad \text{[Equation 5]}$$

Here, Q(Nn(i, j)) is a quantization function, i is an x-axis position of a 2-dimensional pixel P and is a natural number equal to or greater than 0, and j is a y-axis position of a 2-dimensional pixel P and is a natural number equal to or greater than 0.

A sign sign(i, j) of the noise component Nq(i, j) quantized by the noise encoder 207 is defined by the following Equation 6.

$$\text{sign}(i,\ j) = \begin{cases} 1, & \text{if } Nq(i,\ j) > 0 \\ -1, & \text{if } Nq(i,\ j) < 0 \\ 0, & \text{if } Nq(i,\ j) = 0 \end{cases} \qquad \text{[Equation 6]}$$

Here, the sign sign(i, j) of the noise component Nq(i, j) according to Equation 6 becomes 1 when the quantized noise component Nq(i, j) is greater than 0, and becomes -1 when the quantized noise component Nq(i, j) is less than 0, and becomes 0 when the quantized noise component Nq(i, j) is equal to 0.

Meanwhile, a quantized noise component Nq(i, j) of 0 is equivalent to a magnitude of the quantized noise component Nq(i, j) being 0.

At this point, when the sign sign(i, j) of the quantized noise component Nq(i, j) is 1, it may be represented as a binary value of 1, and, when the sign sign(i, j) of the quantized noise component Nq(i, j) is -1, it may be represented as a binary value of 0.

A magnitude Mg(i, j) of the quantized noise component Nq(i, j) is defined by the following Equation 7.

$$Mg(i,j)=|Nq(i,j)| \qquad \text{[Equation 7]}$$

Here, the magnitude Mg(i, j) of the quantized noise component Nq(i, j) according to Equation 7 is defined by an absolute value of the quantized noise component Nq(i, j).

Figure 9:
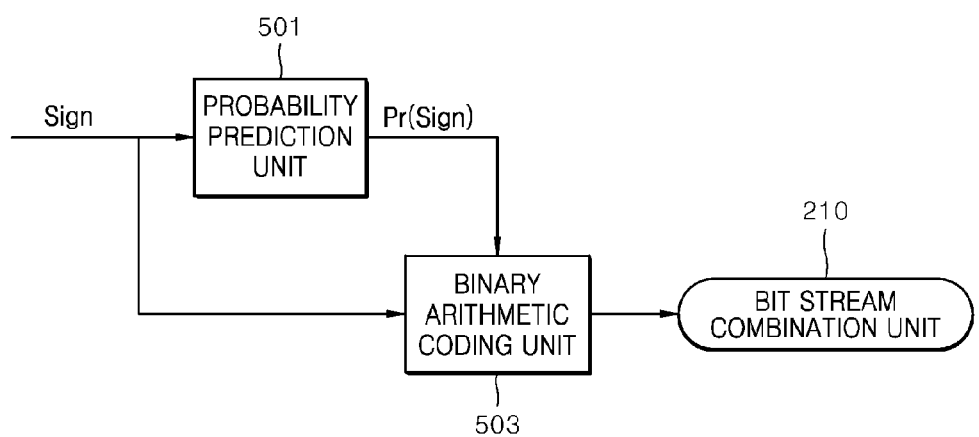
FIGS. 9 and 10 are diagrams illustrating a bit rate control unit for assigning an optimum bit number to a noise component.
Figure 10:
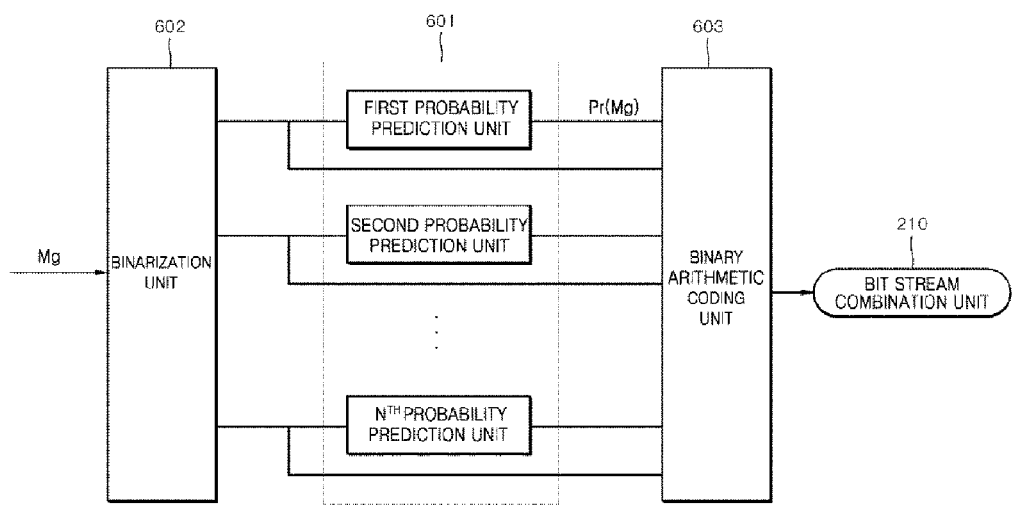

FIGS. 9 and 10 are diagrams illustrating a bit rate control unit for assigning an optimum bit number to a noise component.

As shown in FIG. 9, an optimum bit number of a sign sign of the quantized noise component Nq may be predicted by the probability prediction unit 501.

In particular, the probability prediction unit 501 receives a binary value of the sign sign of the quantized noise component Nq (described above as Nq(i, j) or N'n) and selects peripheral pixels as a sample for predicting probability. Further, the probability prediction unit 501 predicts and assigns a bit number Pr(sign) to a sign sign of a noise component Nq, which is currently to be compressed, according to an occurrence probability of a binary value having the same value as the binary value of the sign sign of the noise component Nq, among binary values of signs sign of noise components of the selected peripheral pixels.

That is, when there are many binary values having the same value as the binary value of the sign sign of the noise component Nq, which is currently to be compressed, among the binary values of the signs of the noise components of the selected peripheral pixels, a smaller bit number for coding the sign sign of the noise component Nq is assigned. On the other hand, when there are less binary values having the same value as the binary value of the sign sign of the noise component Nq, which is currently to be compressed, among the binary values of the signs of the noise components of the selected peripheral pixels, a greater bit number for coding the sign sign of the noise component Nq is assigned.

The binary arithmetic coding unit 503 compresses the sign sign of the noise component Nq with the bit number assigned by the probability prediction unit 501. Further, the compressed sign sign of the noise component Nq is supplied to the bit stream combination unit 210.

As shown in FIGS. 9 and 10, since the sign sign of the noise component Nq is a binary value, it is not necessary for the sign sign of the noise component Nq to undergo a binarization process through a binarization unit 602. However, since the magnitude Mg of the noise component Nq is not a binary value, it should be transformed into a binary number through the binarization unit 602 unlike the sign sign of the noise component Nq.

Such a binary number transformation may be performed according to the binarization function Unary(x) of Equation 1. For example, when a magnitude Mg of the noise component Nq is 11, it may be represented as a binary number of {0, 1, 0, 1} using the binarization function Unary(x).

An optimum bit number of the binarized magnitude Mg of the noise component Nq may be predicted at each binary value by the probability prediction unit 601.

That is, when a binary number consists of n number of binary values, a bit number with respect to each binary value may be predicted. For example, when a magnitude Mg of the noise component Nq is a binary number of {0, 1, 0, 1}, a bit number of each binary value may be predicted through four probability prediction units 601.

At this point, each of the four probability prediction units 601 receives a binary value of the magnitude Mg of the noise component Nq and selects peripheral pixels as a sample for predicting probability. Further, each of the four probability prediction units 601 predicts and assigns a bit number Pr(Mg) to the magnitude Mg of the noise component Nq, which is currently to be compressed, according to an occurrence probability of a binary value having the same value as the binary value of the magnitude Mg of the noise component Nq among binary values of magnitudes of noise components of the selected peripheral pixels.

That is, when there are many binary values having the same value as the binary value of the magnitude Mg of the noise component Nq, which is currently to be compressed, among the binary values of the noise components of the selected peripheral pixels, a smaller bit number for coding the magnitude Mg of the noise component Nq is assigned. On the other hand, when there are less binary values having the same value as the binary value of the magnitude Mg of the noise component Nq, which is currently to be compressed, among the binary values of the noise components with respect to the selected peripheral pixels, a greater bit number for coding the magnitude Mg of the noise component Nq is assigned.

Further, the binary arithmetic coding unit 603 compresses the magnitude Mg of the noise component Nq with the bit number assigned by the probability prediction unit 601. The compressed magnitude Mg of the noise component Nq is supplied to the bit stream combination unit 210.

As a result, the bit stream combination unit 210 generates one bit stream by combining the impulse component I'n and the noise component Nn (or Nq) with each other, which are compressed through different methods.

Figure 11:
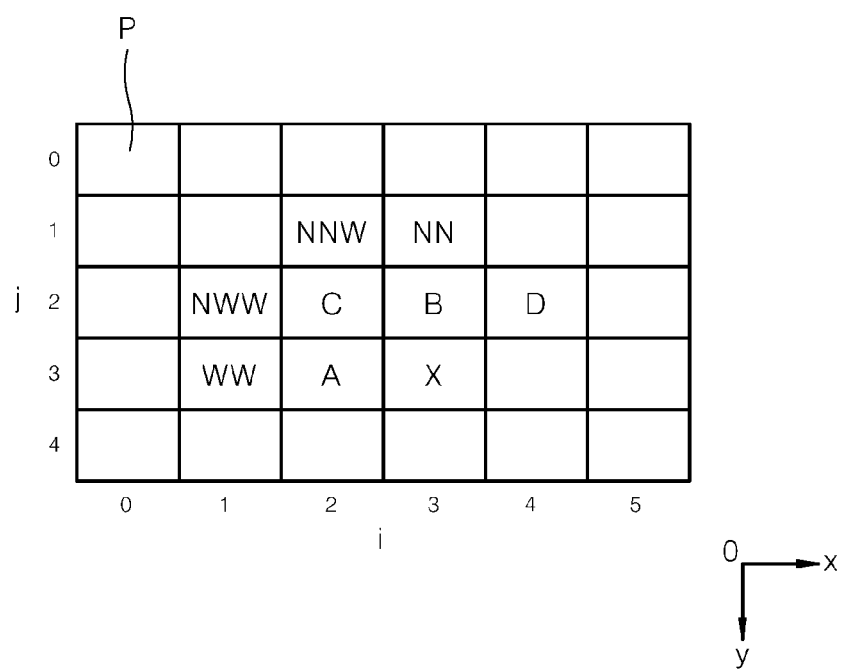
FIG. 11 is a diagram illustrating a 2-dimensional pixel arrangement for describing a probability prediction method of a probability prediction unit of FIGS. 9 and 10.

FIG. 11 is a diagram illustrating a 2-dimensional pixel arrangement for describing a probability prediction method of a probability prediction unit of FIGS. 9 and 10.

Here, i is an x-axis position of a 2-dimensional pixel arrangement and is a natural number equal to or greater than 0, j is a y-axis position of a 2-dimensional pixel arrangement and is a natural number equal to or greater than 0, and a position of each pixel is represented as (i, j).

Further, X(3, 3) is a pixel P to which compensation data to be compressed is assigned, A(2, 3), B(3, 2), C(2, 2), and D(4, 2) are four pixels P closest in distance to X and to which previously compressed compensation data are assigned, and WW(1, 3), NWW(1, 2), NNW(2, 1), and NN(3, 1) are four pixels P close in distance to X next to A, B, C, and D and to which previously compressed compensation data are assigned.

Here, the probability prediction unit 601 may use 8 number of A, B, C, D, WW, NWW, NNW, and NN as samples for predicting probability so as to predict a bit number with respect to a magnitude Mg of a noise component Nq. Since the bit number of the sign sign of the noise component Nq is less than that of the magnitude Mg of the noise component Nq, 6 number of A, B, C, D, NN, and WW closest in distance to X may be used to predict the sign sign of the noise component Nq. Further, a number such as 8 or 6 may be changed according to different embodiments.

Meanwhile, the $n^{th}$ compensation data Dn is restored by adding the decompressed noise component of the $n^{th}$ compensation data to the decompressed $(n-1)^{th}$ compensation data such that separate quantization and compression processes are not needed to be performed on the trend component Tn of the $n^{th}$ compensation data Dn.

On the other hand, since previous compensation data does not exist, a trend component of a first compensation data requires a separate compression process. At this point, the compensation data may be restored by adding the decompressed trend component of the first compensation data and the noise component thereof.

As described above, in accordance with the present disclosure, the trend component of the $n^{th}$ compensation data Dn is not quantized and compressed, the impulse component is compressed without quantization, and the noise component is quantized and compressed by largely setting a quantization step value such that losses of the trend component and the impulse component may be reduced, and at the same time a compression ratio may be improved.

In addition, as the compression ratio is improved, a capacity of the memory 143 of FIG. 4 for storing the compensation data may be reduced so that a manufacturing cost of a display device due to a capacity reduction of the memory may also be reduced.

The above described present disclosure is not limited to any specific type or composition of compensation data, and may be applicable to a case in which compensation data includes a trend component and a noise component or a trend component, a noise component, and an impulse component.

The present disclosure described above may be variously substituted, altered, and modified by those skilled in the art to which the present disclosure pertains without departing from the scope and sprit of the present disclosure. Therefore, the present disclosure is not limited to the above-mentioned exemplary embodiments and the accompanying drawings.

What is claimed is:

1. A method for compressing data by an organic light emitting diode display device, comprising:
receiving $n^{th}$ data, wherein n is a natural number equal to or greater than 2;
receiving a trend component of a $(n-1)^{th}$ data, the trend component being a value that is used in compensating for a deviation of a threshold voltage of a driving transistor, and a noise component of the $(n-1)^{th}$ data, the $(n-1)^{th}$ data being previous data assigned to a pixel located at a periphery of a pixel corresponding to the $n^{th}$ data;
restoring the $(n-1)^{th}$ data by combining the trend component of the $(n-1)^{th}$ data with an inverse quantized and decompressed noise component of the $(n-1)^{th}$ data;
extracting a noise component of the $n^{th}$ data by subtracting the restored $(n-1)^{th}$ data from the $n^{th}$ data;
calculating a trend component of the $n^{th}$ data by subtracting the noise component of the $n^{th}$ data from the $n^{th}$ data; and
quantizing and compressing the extracted noise component of the $n^{th}$ data.

2. The method of claim 1, wherein the trend component of the $n^{th}$ data is calculated through a probability prediction based on data previous to the $n^{th}$ data.

3. The method of claim 1, wherein the quantizing and compressing the extracted noise component of the $n^{th}$ data includes:
determining a sign and a magnitude of the quantized noise component of the $n^{th}$ data;
binarizing the magnitude of the quantized noise component of the $n^{th}$ data through a binarization function; and
compressing the sign and the binarized magnitude of the quantized noise component of the $n^{th}$ data by binary arithmetic coding.

4. The method of claim 1, wherein the $n^{th}$ data further includes an impulse component having a value greater than that of the noise component, the value being a command associated with the driving transistor, and
wherein the method further includes:
separating the $n^{th}$ data into a sub-bit stream including the impulse component and a sub-bit stream not including the impulse component before the predicting and calculating the trend component of the $n^{th}$ data.

5. The method of claim 4, wherein the impulse component of the $n^{th}$ data is detected through a probability prediction based on impulse components of data prior to the $n^{th}$ data.

6. The method of claim 4, further comprising:
extracting a flag and a value of the impulse component of the $n^{th}$ data;
binarizing the value of the impulse component of the $n^{th}$ data through a binarization function; and
compressing the flag and the binarized value of the impulse component of the $n^{th}$ data by binary arithmetic coding.

7. An organic light emitting diode display device, comprising:

a data driving unit that generates $n^{th}$ compensation data including a trend component of the $n^{th}$ compensation data, the trend component being a value that is used in compensating for a deviation of a threshold voltage of a driving transistor, and a noise component of the $n^{th}$ compensation data that has an error value based on the trend component, wherein n is a natural number equal to or greater than 2;
a data restoration unit that restores $(n-1)^{th}$ compensation data, the $(n-1)^{th}$ compensation data being previous compensation data assigned to a pixel located at a periphery of a pixel corresponding to the $n^{th}$ compensation data, by receiving a trend component of the $(n-1)^{th}$ compensation data and a noise component of the $(n-1)^{th}$ compensation data, and combining the trend component of the $(n-1)^{th}$ compensation data with an inverse quantized and decompressed noise component of the $(n-1)^{th}$ compensation data;
a noise extraction unit that extracts the noise component of the $n^{th}$ compensation data by subtracting the restored $(n-1)^{th}$ compensation data from the $n^{th}$ compensation data;
a trend calculation unit that receives the $n^{th}$ compensation data and calculates the trend component of the $n^{th}$ compensation data by subtracting the noise component of the $n^{th}$ compensation data from the $n^{th}$ compensation data; and
a noise encoder that quantizes and compresses the extracted noise component of the $n^{th}$ compensation data.

8. The organic light emitting diode display device of claim 7, wherein the trend component of the $n^{th}$ compensation data is calculated through a probability prediction based on compensation data prior to the $n^{th}$ compensation data.

9. The organic light emitting diode display device of claim 7, wherein the noise encoder determines a sign and a magnitude of the quantized noise component of the $n^{th}$ compensation data, binarizes the magnitude of the quantized noise component of the $n^{th}$ compensation data through a binarization function, and compresses the sign and the binarized magnitude of the quantized noise component of the $n^{th}$ compensation data by binary arithmetic coding.

10. The organic light emitting diode display device of claim 7, wherein the $n^{th}$ compensation data further includes an impulse component having a value greater than that of the noise component, the value being a command associated with the driving transistor, and
wherein the organic light emitting diode display device further includes:
an impulse detection unit to separate the $n^{th}$ compensation data into a sub-bit stream including the impulse component and a sub-bit stream not including the impulse component before predicting and calculating the trend component of the $n^{th}$ compensation data.

11. The organic light emitting diode display device of claim 10, wherein the impulse component of the $n^{th}$ compensation data is detected through a probability prediction based on impulse components of compensation data prior to the $n^{th}$ compensation data.

12. The organic light emitting diode display device of claim 10, further comprising:
an impulse encoder to extract a flag and a value of the impulse component of the $n^{th}$ compensation data, binarize the value of the impulse component of the $n^{th}$ compensation data through a binarization function, and compress the flag and the binarized value of the impulse component of the $n^{th}$ compensation data by binary arithmetic coding.

\* \* \* \* \*